United States Patent [19]

Lippman

[11] Patent Number: 4,674,846
[45] Date of Patent: Jun. 23, 1987

[54] MICROSCOPE SLIDE SYSTEM

[76] Inventor: Robert Lippman, 27 Underhill Ave., Syosset, N.Y. 11791

[21] Appl. No.: 753,928

[22] Filed: Jul. 11, 1985

[51] Int. Cl.⁴ .................. G02B 21/30; G02B 21/34
[52] U.S. Cl. ............................. 350/536; 350/533; 350/523; 350/534; 362/31; 362/32
[58] Field of Search ............... 350/523, 528, 534, 535, 350/536; 362/32, 31

[56] References Cited

U.S. PATENT DOCUMENTS

| | | | |
|---|---|---|---|
| 3,031,924 | 5/1962 | Lamal | 350/536 |
| 3,278,739 | 10/1966 | Royka et al. | 362/32 |
| 3,969,013 | 7/1976 | Poty et al. | 350/528 |
| 3,971,621 | 7/1976 | Albrecht-Buehler | 350/528 |

FOREIGN PATENT DOCUMENTS

| | | | |
|---|---|---|---|
| 141284 | 4/1935 | Fed. Rep. of Germany | 350/523 |
| 3417075 | 11/1985 | Fed. Rep. of Germany | 350/523 |
| 85446 | 7/1978 | Japan | 350/523 |
| 145912 | 8/1983 | Japan | 362/32 |

Primary Examiner—Jon W. Henry
Attorney, Agent, or Firm—Wyatt, Gerber, Shoup, Scobey and Badie

[57] ABSTRACT

A microscope slide illumination system is adapted for the side lighting of particles suspended in liquid, where the liquid is retained in a depression in a microscope slide. The system includes a laser source of light, an optic fiber bundle to conduct the laser light, and a single fiber, preferably having a focused lens tip, to focus the laser light into the slide depression. In one embodiment a single optical fiber is located in a bore of the slide and in another embodiment the free ends of a group of single optical fibers terminate around the slide depression.

16 Claims, 6 Drawing Figures

MICROSCOPE SLIDE SYSTEM

BACKGROUND OF THE INVENTION

The present invention relates to microscope slide systems and more particularly to such systems for the illumination of opaque particles suspended in a liquid.

At the present time it is known that it is difficult to properly illuminate material containing opaque particles suspended in a liquid and positioned on a slide for microscope examination. For example, a coal slurry comprises micron-sized non-uniform particles of coal which are suspended in oil or water in which the particles are opaque. In many conventional slide systems, the slide illumination is from below and along the axis of the microscope tube. Such light will be scattered by the opaque coal particles. When a photograph is taken of the coal slurry, it will be unclear if there are many opaque particles within the field of view. The use of high-powered illumination, such as a laser beam, does not provide a clearer image, since even such high-powered light beams are dissipated by the opaque particles.

It is important to view coal slurries and similar fuels under a microscope, and to obtain photographic records of the microscope images, in order to obtain engineering and scientific studies, for example, to study the effect that particle size distribution has on combustion. In addition, such microscopic examination is important in the quality control of the manufacture and purchasing of coal slurries.

OBJECTIVES AND FEATURES OF THE INVENTION

It is an objective of the present invention to provide a microscope slide system in which coal slurries and other opaque particle systems may be illuminated to present a clear optical image, both for immediate viewing and for photography.

It is a further objective of the present invention to provide such a microscope system in which the source of illumination does not overheat the material on the slide, to prevent burning the material or otherwise altering its composition or state.

It is a further objective of the present invention to provide such a microscope slide system in which the material on the slide may be gently and evenly heated to an exact selected temperature without overheating portions of the material.

It is a feature of the present invention to provide a microscope slide system for the illumination of material by microscope examination, for example, to examine coal slurries. The system includes a microscope having a microscope tube with an imaginary axis, a viewing stage and slide mounting means to removably mount a slide at the viewing stage.

A laser source of light is used to illuminate the material which is positioned on a transparent microscope slide. The slide is mounted on the slide mounting means and has opposite top and bottom faces generally perpendicular to the microscope tube axis and opposite side faces. A light conduction means, preferably a bundle of optical fibers, conducts laser light from the laser source to a side face of the slide. The slide has mounting means to mount the light conduction means on the slide in order to illuminate the material from the side with the laser light. Light sources other than lasers may be used.

In one embodiment the slide has a depression on its top face adapted to receive liquid material and an internal bore from its side face toward the depression, with the optical fiber extending through the bore.

In another embodiment the slide has heating means, such as a partial layer of electrically resistive material, on a face of the slide to heat the material positioned on the slide and also has a thermocouple to measure and control the heat.

In still another embodiment the laser is connected to a plurality of optical fibers and the free ends of said fibers are arranged around the depression. The fibers are separated at opposite sides of the depression to illuminate the material therein from opposite sides.

BRIEF DESCRIPTION OF THE DRAWINGS

Other objectives and features of the present invention will be apparent from the detailed description provided below taken in conjunction with the accompanying drawings.

In the drawings.

DETAILED DESCRIPTION OF THE INVENTION

Figure 1:
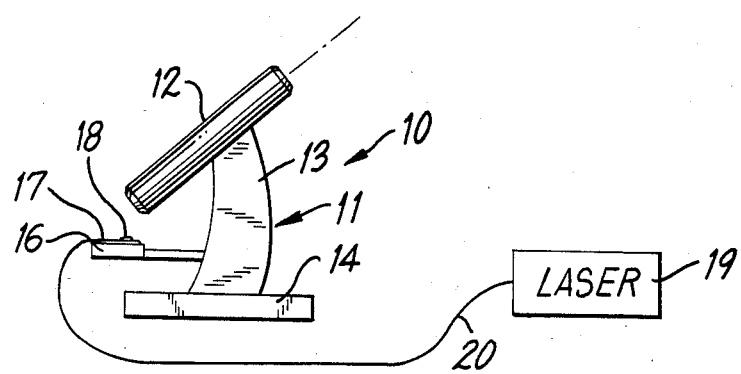
FIG. 1 is a side schematic view showing portions of the microscope system of the present invention in block diagram.

As shown in FIG. 1, the present invention relates to a microscope system 10 which is particularly adapted for the microscopic examination of liquids having opaque particles. For example, the microscope system 10 may be utilized to examine coal slurries in which particles of coal (more than 85% of particles are less than 75 microns in diameter) are suspended in oil or water.

As shown in FIG. 1, the microscope 11, which may itself be of conventional construction, includes a microscope tube 12 having an imaginary central axis. The microscope tube 12 is mounted on a projection arm 13 which is pivotly mounted on base 14. A microscope viewing stage 16 is connected to support arm 15. A slide 17 is removably positioned on the stage 16 by spring member 18. A laser source 19 provides the illumination for the microscope slide. A light conduit means, which is preferably a bundle 20 of optical fibers, conducts the light from laser source 19 to the microscope slide 17. The laser source preferably is of sufficient power to illuminate the sample and of a frequency to match film specifications, i.e., a tunable laser. However, a conventional light source of sufficiently high power and correct color temperature could be used.

Figure 2:
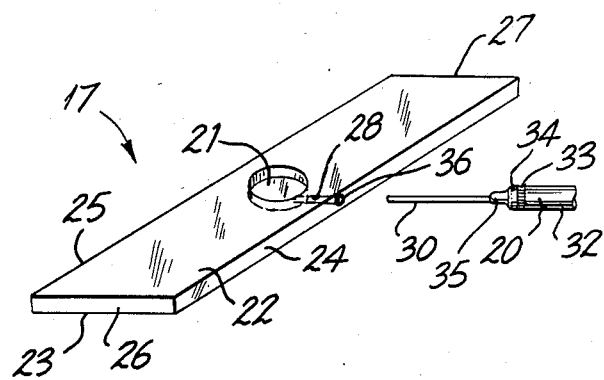
FIG. 2 is a perspective view, in the first embodiment of the present invention, showing the microscope slide and optical fiber bundle prior to assembly.

FIG. 2 shows an enlarged view of the microscope slide 17 which may be of transparent glass having a depression 21 at its center. The depression 21 is adapted to contain liquid materials such as a drop of coal slurry. The microscope slide 17 has a flat top face 22, an opposite and parallel flat bottom face 23, and four side walls. The long side wall 24 is opposite and parallel to the long side wall 25 and the short side wall 26 is opposite and parallel to the short side wall 27.

The body of the slide 17 has a bore 28 which extends from the center of the side wall 24 to within the depression 21. A single fiber optic 30, which is the light conduit, is connected with the slide to illuminate liquid material within the depression 21. The single fiber 30 receives its light from the bundle of non-oriented optical fibers of bundle 20. Each of the optical fibers consists of a central core of glass or plastic having one index of refraction, and a tubular cladding, either of glass or plastic, having a different and higher index of refraction. Light which enters one end of the optical fiber exits with very little loss from the opposite free end of the optical fiber. The bundle 20 of optical fibers is enclosed in a protective tube 32 and terminates, using a standard connector 33, to a tip member 34 whose end 35 is reduced in size so that it fits in a female cavity 36 of the bore 28. The single fiber 30 extends from the tip 34 to within the bundle 20. The tip 40 of the single fiber 30 is a lens which will focus the light at the desired posion within the depression 21.

In one alternative, if the optical fiber is of a suitable material, for example glass, the tip 40 may be optically ground to form a convex lens to focus its light at the selected focal length within the depression 21. As an alternative, which is particularly adapted for use in connection with plastic optical fibers, the tip of the optical fibers may be molded to form a convex lens which, as in the case of the ground lens, has a selected focal length to focus the light at the desired location within the depression 21.

Figure 3:
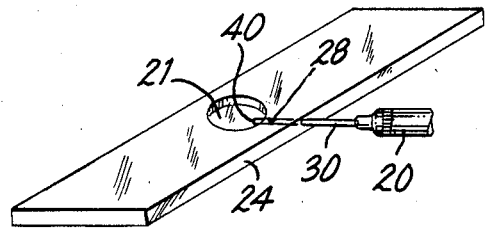
FIG. 3 is a perspective view, showing the microscope slide and optical fiber bundle of FIG. 3, after assembly.

As shown in FIG. 3, the single fiber 30 is positioned within the bore 28 and adhered therein. For example, a suitable adhesive is an epoxy resin which will firmly adhere the single optical fiber 30 within the bore 28.

Figure 4:
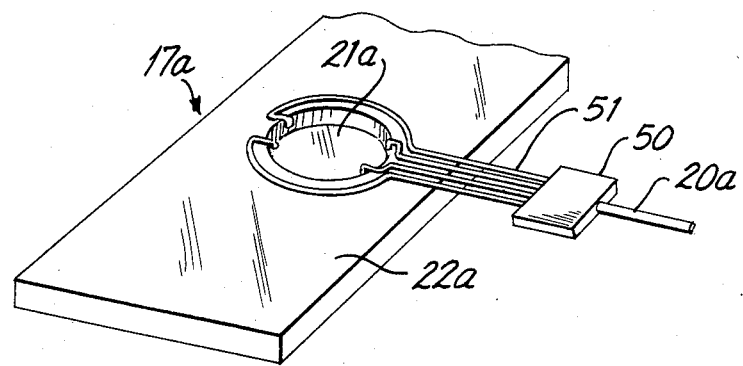
FIG. 4 is a perspective view of a second embodiment of the present invention.

An alternative embodiment is shown in FIG. 4, in which the connector 50 connects the bundle of individual optical fibers 51 to the fiber bundle 20a. The fiber bundle 20a, as in the prior embodiment, is connected to the laser source 19. The individual optical fibers 51 preferably have each of their ends formed to form a focused beam at the desired focal length within the depression 21a of the slide 17a. In this embodiment the ends of the individual fibers 51 are arranged in a circle within the depression 21a. The fibers 51 are adhered to the top face of the slide 17a by a suitable adhesive.

Figure 6:
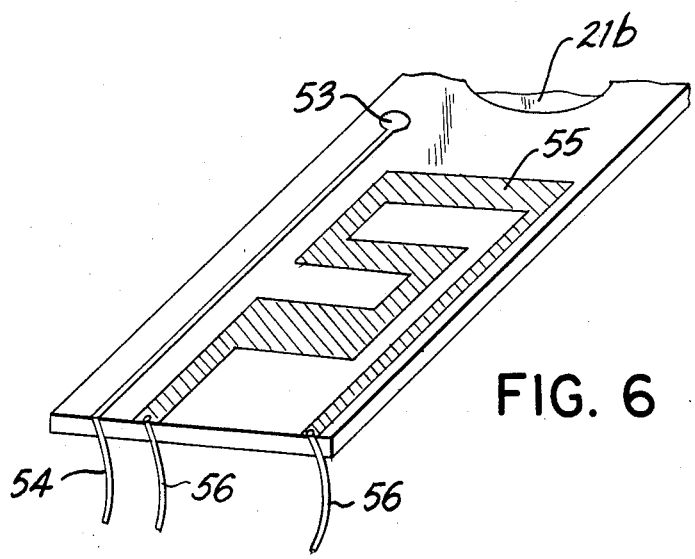
FIG. 6 is a perspective view of a third embodiment of the present invention.

In the embodiment of FIG. 6, the slide is heated by electrical resistive elements which are formed on the surface of the slide. Such resistive elements are formed, for example, by electro-forming or electro-plating on the glass surface. When an electrical current is passed through the flat-plated resistive elements, they become heated and thereby heat the slide and the material within the depression 21b of the slide. In addition, a thermocouple 53 is positioned on the top face of the slide near the depression 21b. The thermocouple 53 is connected by wires 54 to a temperature detection circuit. The temperature detection circuit, by feed-back, controls the resistive heating network 55. The resistive heating network 55 is connected to the electrical source by wires 56. FIG. 6 shows one-half of the slide. The other half of the slide is symmetrically arranged in order to insure heating with a uniform gradient.

Figure 5:
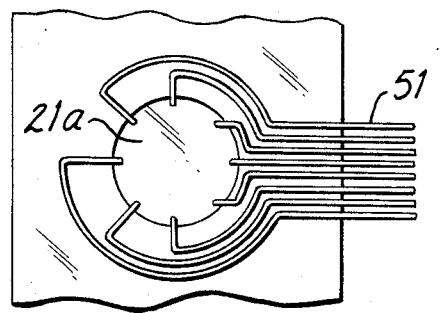
FIG. 5 is a top plan view, enlarged, showing a variation of the second embodiment.

Modifications may be made in the slide system of the present invention within the scope of the subjoined claims. For example, in FIG. 5 there are eight single optical fibers 51 which terminate in the depression 21a; instead of the four fibers shown in FIG. 4. In FIGS. 2 and 3 the individual fiber 30 is inserted into bore 28; instead, it may be adhered on the top face of the slide.

What is claimed is:

1. A microscope slide system for the illumination of material by microscope examination, the system including a microscope having a microscope tube with an imaginary axis, a viewing stage and slide mounting means to removably mount a slide at the viewing stage;
   a source of light, a transparent microscope slide mounted on said slide mounting means and having opposite top and bottom faces generally perpendicular to said microscope tube axis and opposite side faces, a light conduction means to conduct light from said source to a side face of said slide, and mounting means to mount said conduction means on said slide to illuminate said material from the side with laser light.

2. A microscope slide system as in claim 1 wherein the light source is a laser light.

3. A microscope slide system as in claim 1 wherein said slide has a depression on said top face adapted to receive liquid material.

4. A microscope slide system as in claim 1 wherein light conduction means is an optical fiber.

5. A microscope slide system as in claim 1 wherein said light conduction means is an optical fiber, said slide has an internal bore from its side face toward its center, and said optical fiber extends through said slide bore and has at its free end a focused tip which tip is formed to the selected focal length and which tip extends into said depression.

6. A microscope slide system as in claim 1 wherein said slide has heating means affixed thereon to heat the material positioned on said slide.

7. A microscope slide system as in claim 1 wherein said slide has an electrically resistive layer at least partly coating said slide to heat said slide.

8. A microscope slide system as in claim 1 wherein said top face of the slide has a depression therein adapted to contain liquid material to be examined, said light conduction means is a plurality of optical fibers, and the free ends of said fibers are arranged, at the edges of said depression and separated at opposite sides of said depression to illuminate the material therein from said opposite depression sides.

9. A microscope slide having opposite top and bottom flat faces and opposite side edges, a depression in said top face adapted to retain liquid therein, a bore in said slide leading from one of said side edges to said depression, and a fiber optic within said bore and extending from said depression and through said bore outwardly therefrom and adapted at the opposite end from said depression to be connected to a source of illuminating light.

10. A microscope slide system as in claim 7 wherein said slide has heating means thereon to heat the material in said depression.

11. A microscope slide system as in claim 7 wherein said slide has electrically resistive layer at least partly coating said slide to heat said slide and a thermocouple to detect the slide temperature.

12. A microscope slide system for the illumination of material by microscope examination, the system including a microscope having a microscope tube with an imaginary axis, a viewing stage and slide mounting means to removably mount a slide at the viewing stage;

a laser source of light, a transparent microscope slide mounted on said slide mounting means and having opposite top and bottom faces generally perpendicular to said microscope tube axis and opposite side faces, said slide having a depression on said top face adapted to receive liquid material; an optical fiber conduction means to conduct laser light from said laser source to a side face of said slide, and mounting means to mount said optical fiber on said slide to illuminate said material in said depression from the side with laser light.

13. A microscope slide system as in claim 12 wherein said slide has an internal bore from its side face toward its depression, and said optical fiber extends through said slide bore and terminates at the side wall of said depression.

14. A microscope slide system as in claim 12 wherein said slide has a layer of electrically resistive heating means affixed thereon to heat the material positioned on said slide.

15. A microscope slide having opposite top and bottom flat faces and opposite side edges, a depression in said top face adapted to retain liquid therein, a bore in said slide leading from one of said side edges to said depression, and a plurality of optical fibers within said bore and extending outwardly therefrom and adapted at the opposite end from said depression to be connected to a source of illuminating light, said optical fibers terminating at opposite sides of said depression to illuminate said depression from its sides.

16. A microscope slide system as in claim 15 wherein said slide has a layer of electrically resistive heating means thereon to heat the material in said depression.

* * * * *